Figure 1:
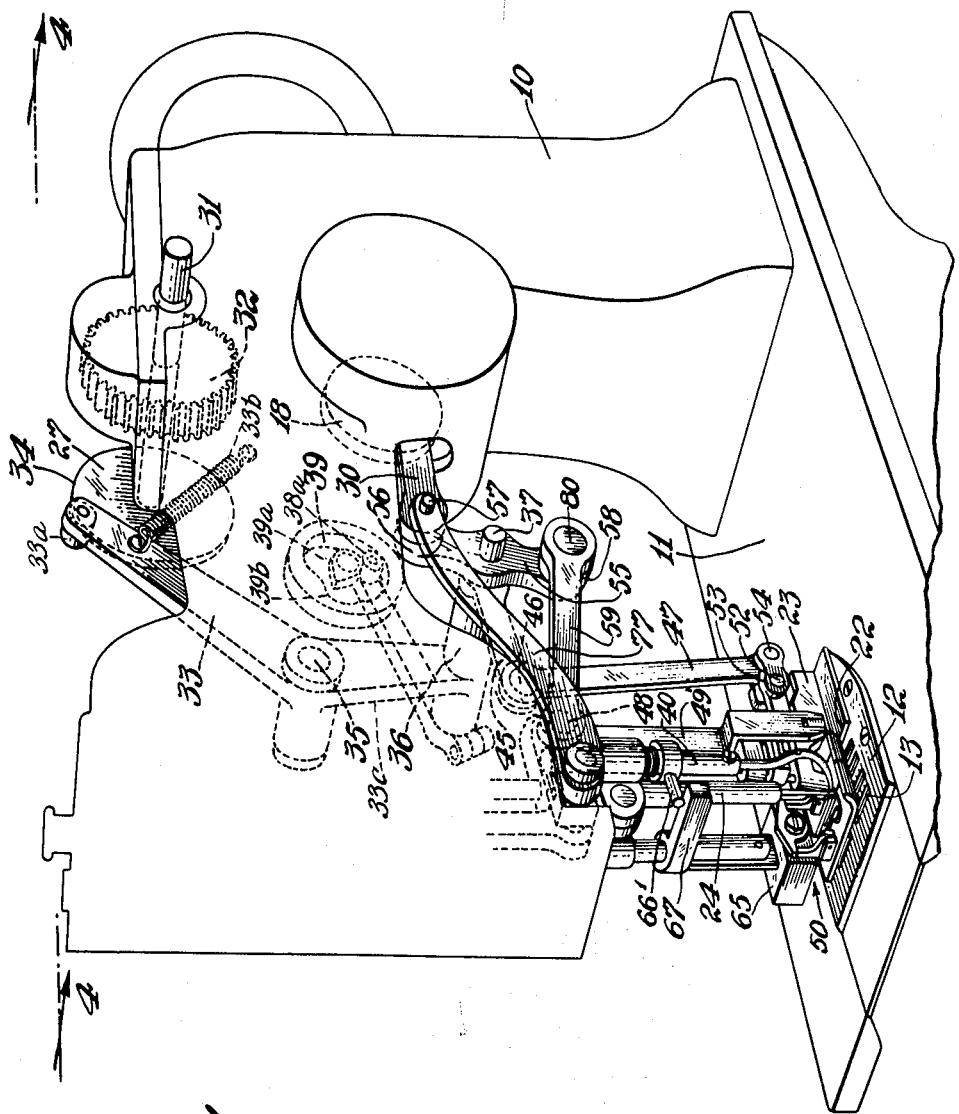

Feb. 28, 1956   J. H. BEUERLE   2,736,281
GARMENT FINISHING DEVICE
Original Filed June 29, 1951   7 Sheets-Sheet 1

INVENTOR.
Joseph Henry Beuerle
BY
Jacob J. Bobrow
ATTORNEY

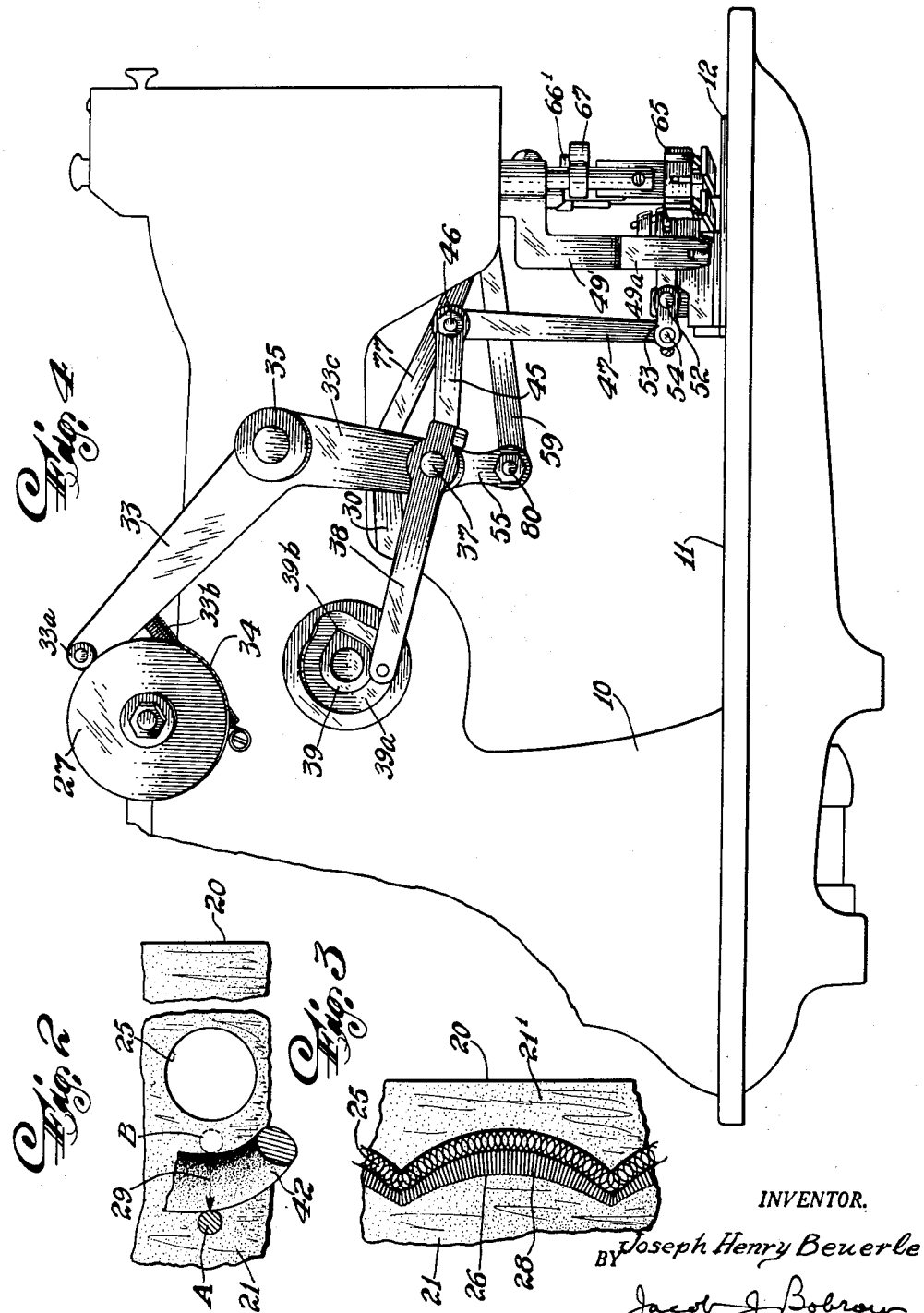

Feb. 28, 1956 J. H. BEUERLE 2,736,281
GARMENT FINISHING DEVICE
Original Filed June 29, 1951 7 Sheets-Sheet 3
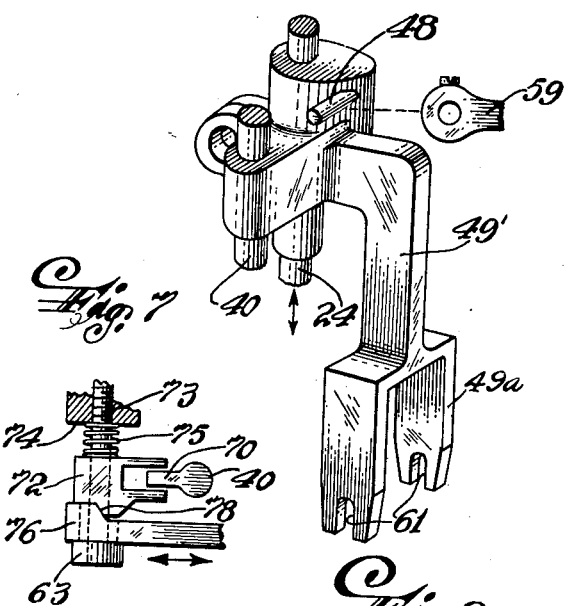
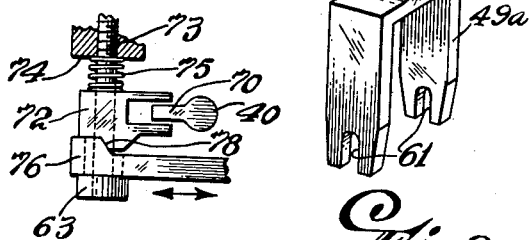
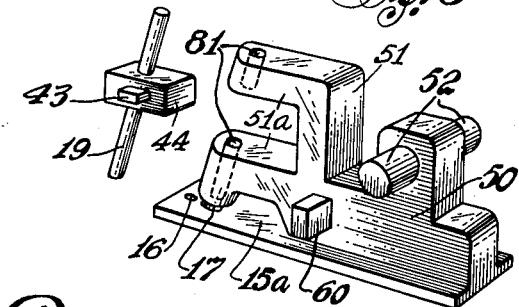
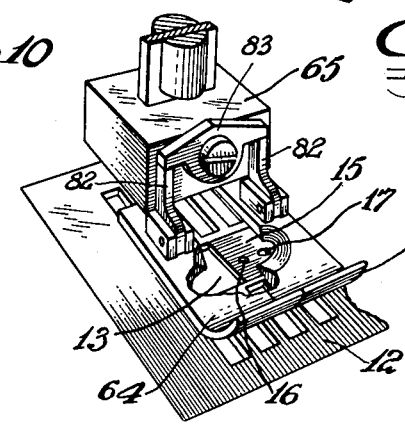
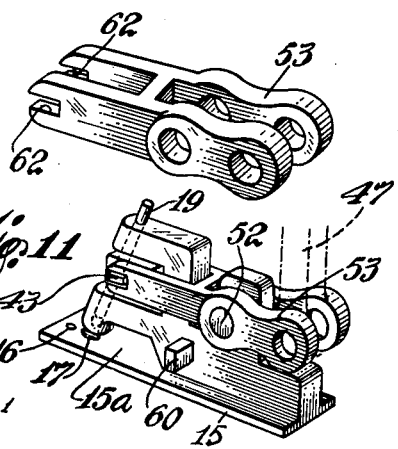
INVENTOR.
Joseph Henry Beuerle
BY
Jacob J Bobrow
ATTORNEY

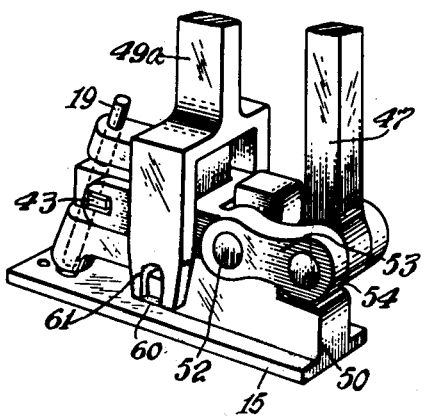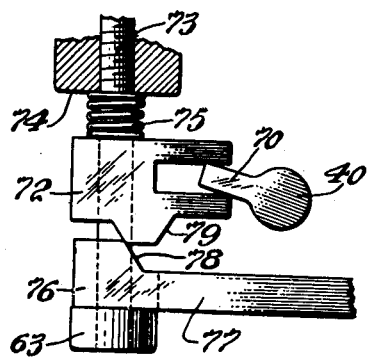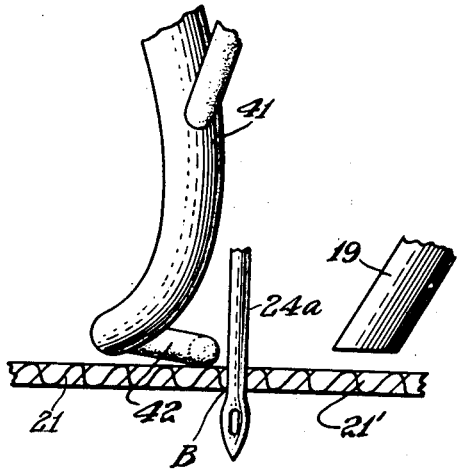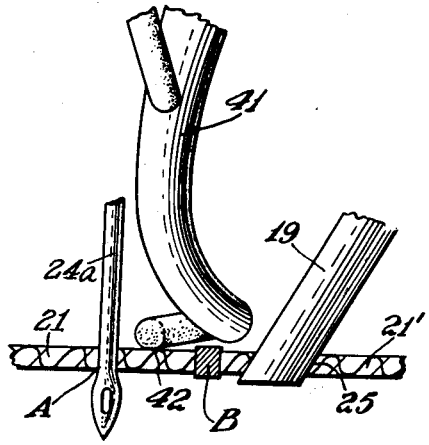

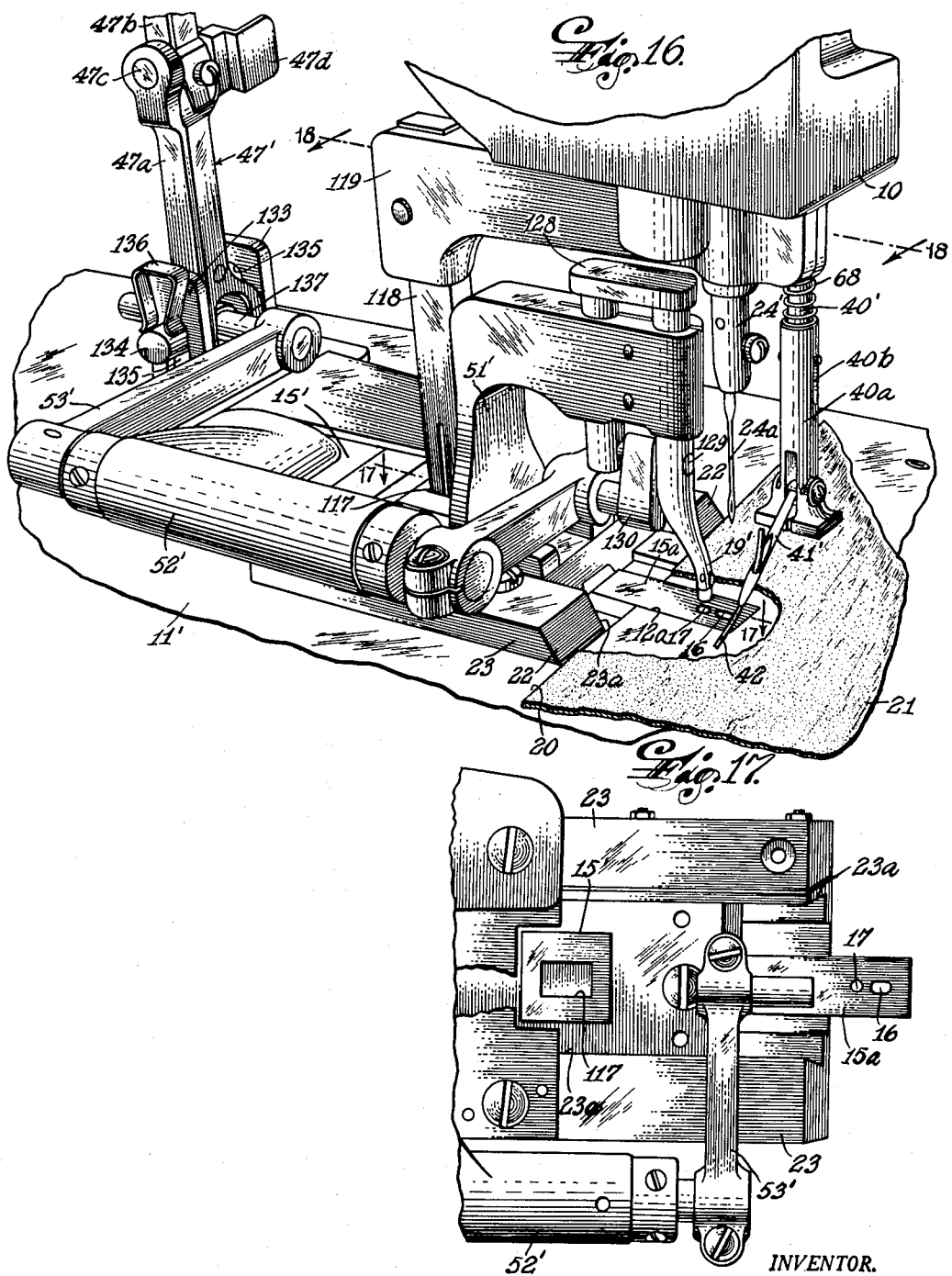

Feb. 28, 1956 J. H. BEUERLE 2,736,281
GARMENT FINISHING DEVICE
Original Filed June 29, 1951 7 Sheets-Sheet 6
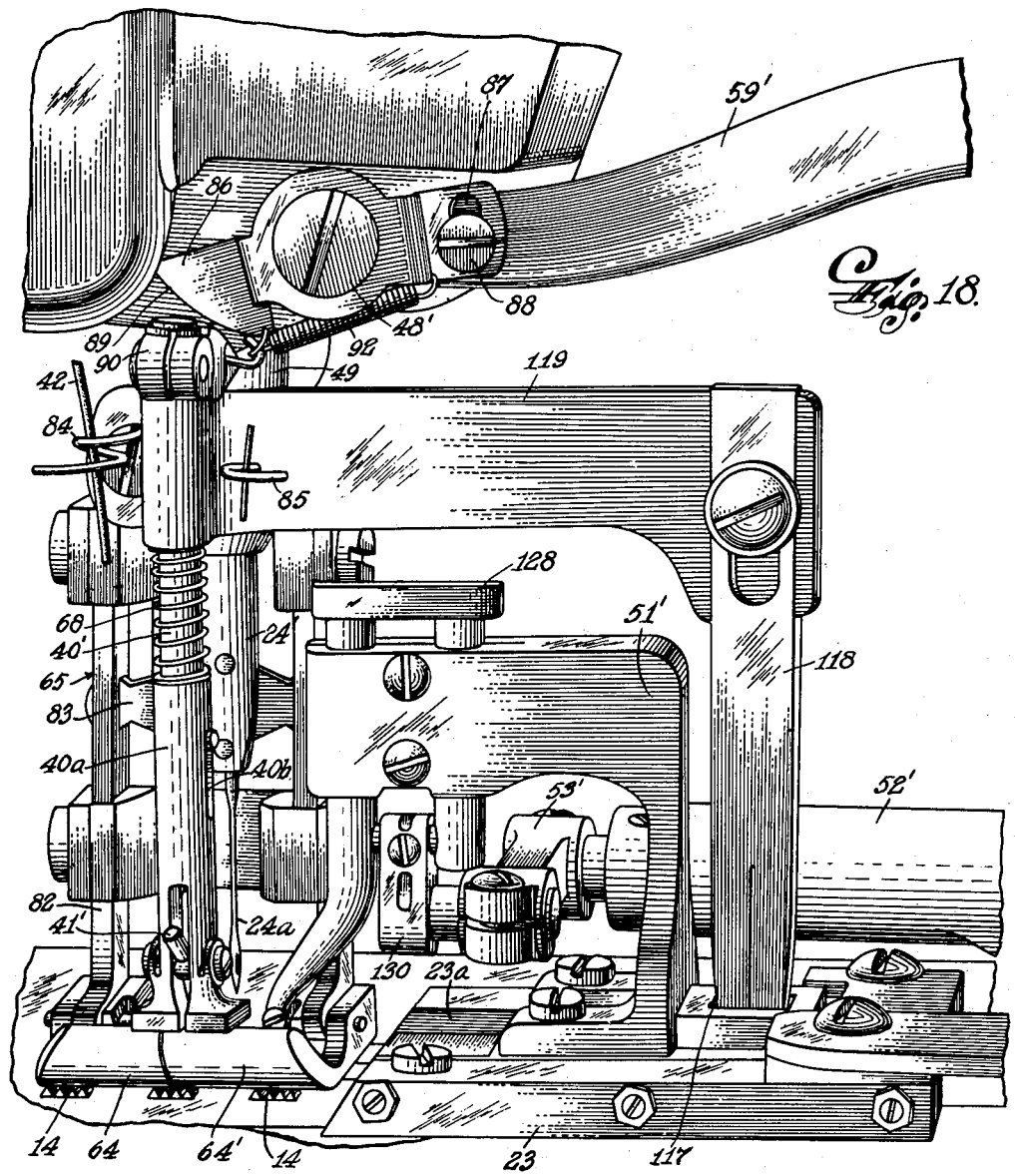
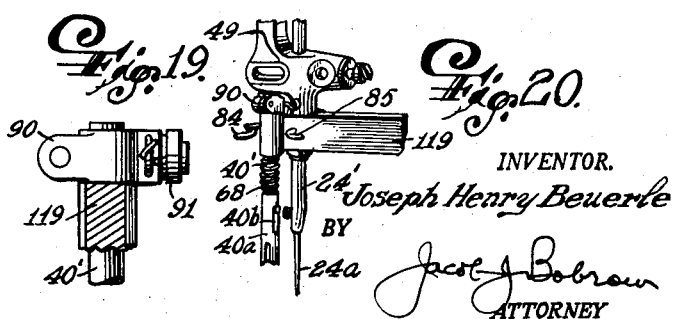
INVENTOR.
Joseph Henry Beuerle
BY
Jacob J. Bobrow
ATTORNEY INVENTOR.
Joseph Henry Beuerle
BY
Jacob J. Bobrow
ATTORNEY

United States Patent Office 2,736,281
Patented Feb. 28, 1956

2,736,281

GARMENT FINISHING DEVICE

Joseph Henry Beuerle, South Amboy, N. J., assignor to Man-Sew Corp., New York, N. Y., a corporation of New York Continuation of abandoned application Serial No. 234,294, June 29, 1951. This application May 18, 1955, Serial No. 509,173

17 Claims. (Cl. 112—98)

This invention relates to that type of sewing machine which is useful for producing ornamental stitching in the nature of embroidery, such as scalloping, and which incorporates the essential features of the well known laterally vibrating needle or zigzag machine to which additional mechanism has been added to provide for concurrently shifting the work area of the needle laterally to form a design. More particularly, it relates to an attachment for such machines which automatically cuts away the waste material from the edge of the scallop or other finished design simultaneously with the forming of the ornamental stitching.

This is a continuation-in-part of my earlier applications Serial No. 765,191, filed July 13, 1947, Serial No. 106,861 filed July 26, 1949, and a continuation of Serial No. 234,294, filed June 29, 1951, all now abandoned.

Many attempts have been made to eliminate hand trimming of the scalloped edge by stitching and trimming the edge in the same machine, notably, as for example by Ort, as shown in Patent 1,074,452 of September 13, 1913, by Rogers, as shown in Patent 1,256,731, February 19, 1930, by Maier, as shown in Patent 1,762,479 of June 10, 1930, and by Loeb, as shown in Patent 2,145,885 of February 7, 1939.

These previous attempts have been of two general types. Ort and Rogers trim the excess material after the stitching is completed, while Maier and Loeb precut the scallop and then overcast the edge with stitching. Both methods have the disadvantage of loss of control over the work. Where the design edge is precut, the feed dog and presser foot obviously cannot hold the excess portion of the material which is normally trimmed from the design edge, and the work therefore tends to shift and curl under the needle stitching action with unsatisfactory end results. Where the work is trimmed subsequent to the stitching, the operator is faced with the necessity of monitoring two distinct and unrelated operations, one of which usually suffers.

In the instant solution of this long standing problem, the cutting takes place simultaneously with the stitching in such manner that control over the embroidered edge is retained during both operations.

While it has been a primary object to provide a machine and cutting attachment whereby garments may be manufactured with design edges of any predetermined style with the excess material cut away to leave a finished edge, another object has been to provide means whereby the cutting mechanism may be disconnected at the option of the operator to permit sewing the design on the whole cloth where that is desired.

It has been a further object to provide a simple and effective means for guiding a filler cord (commonly known as gimp) to and under the zigzag stitching. Gimp is frequently used when it is desired to fill out or thicken the embroidered design. In these particular embodiments, the filler cord or gimp is always shifted in opposition to the lateral swing of the needle bar frame so that the gimp is drawn to one side against the thread extending from the last needle penetration so that the gimp will be crossed by the thread as the needle descends to complete the stitch. This action assures the locking of the gimp under each stitch.

Figure 21:
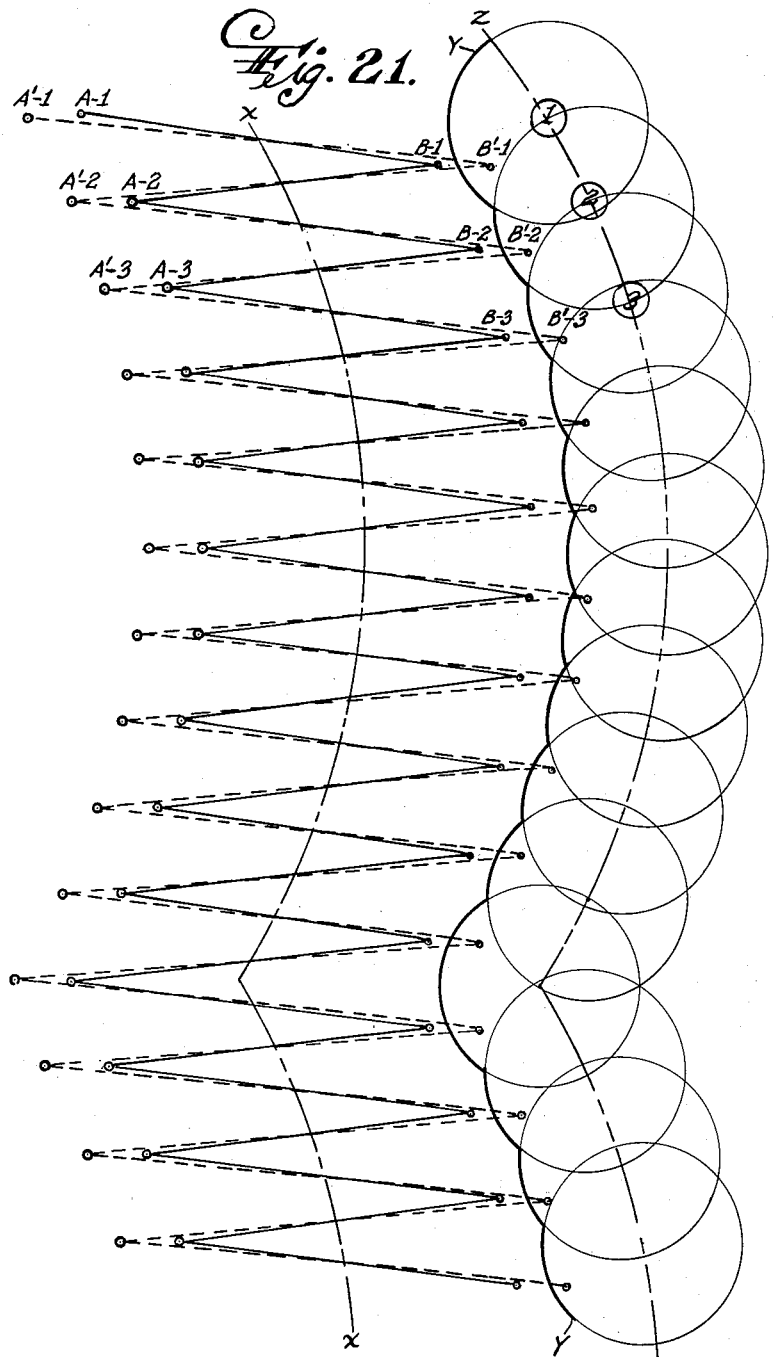

In the drawings:

Fig. 1 is a perspective view of a conventional and well known sewing machine of the zigzag type to which the invention has been applied, Fig. 2 is a schematic view, on an enlarged scale, illustrating steps employed in finishing a garment pursuant to the invention, Fig. 3 is a similar view, on a smaller scale, Fig. 4 is a side elevational view of the device, taken on line 4—4 of Fig. 1, Fig. 5 is a perspective view of one type of guide element for the cutting mechanism, Fig. 6 is a perspective view of one type of gimp shifting means and parts associated therewith, Fig. 7 is a horizontal plan view, partly fragmentary and sectional, showing the parts of Figure 6 in detail, Fig. 8 is a perspective view of one type of cutting mechanism, disassembled, Fig. 9 is a perspective view of the cutter operating yoke used with the mechanism shown in Figure 8, Fig. 10 is a fragmentary perspective view of one typical presser foot assembly used with a sewing machine to which the invention has been applied, Fig. 11 is a perspective view of the assembled cutting mechanism shown in Figures 8 and 9, Fig. 12 is a perspective view of the cutting mechanism of Figure 11, showing the guide element of Figure 5 operatively connected thereto, and showing the generally vertically reciprocating rod 47 which connects the cutter operating yoke of Figure 9 with the operating means for the cutting mechanism, Fig. 13 is a schematic, sectional view illustrating the manner in which the needle fixed to needle bar 24 descends in making stitch penetration B, during which operation the gimp feeder tube 41 is rotated to a position away from penetration B, Fig. 14 is a similar view, showing the location of the parts when the needle descends to make the laterally spaced stitch penetration A, during which, the cutter descends to make cut 25 in the material 21, and during which, the gimp feeder tube 41 is shifted (by means more fully shown in Figs. 6 and 7 in the first type of gimp support operating means and in Figs. 16, 18, 19 and 20, in a second type of gimp support operating means) to a position away from stitch penetration, Fig. 15 is a horizontal plan view, partly fragmentary and sectional, illustrating the position of the parts shown in Fig. 7 responsive to the actuation of end 76 of arm 77 in Fig. 7 against the tension of spring 75, Fig. 16 is a fragmentary, perspective view of a second type of cutting mechanism and a second type of gimp shifting means, shown attached to the head of a conventional sewing machine similar to that of Fig. 1, Fig. 17 is a fragmentary plan view taken on line 17—17 of Fig. 16, Fig. 18 is a fragmentary perspective view taken on line 18—18 of Fig. 16, showing certain parts broken away in Fig. 16, Fig. 19 is a fragmentary, partly sectional, elevational view of the upper end of the bracket supporting the gimp shifting means of Fig. 18, Fig. 20 is a fragmentary, perspective view of the needle bar guide frame and the gimp support bracket of Fig. 19 fixed thereto, and Fig. 21 is schematic, greatly enlarged representation of the effect on the work piece of the feed movement and the needle movement laterally from penetration to penetration as the cutting action takes place on alternate lateral throws of the needle bar along a short section of a scalloped edge, showing also the effect of changing the bight or lateral needle throw.

As may be noted from Figs. 2 and 3 a stitched finished edge 28 is applied to the work 21 adjacent the garment edge 20 to define a general pattern 26, the principal axial line of which is predetermined by a selected cam surface as for example surface 34 of cam 27. In the form shown in Figs. 3 and 21, the axial line is in the form of repeated arcs or the well known scallop design.

As will also be noted from Figs. 3 and 21, the overlapping cuts 25 completely trim the material edge immediately adjacent the outer stitch penetrations B so that that portion 21' of the material beyond said overlapping apertures will drop away or may be removed. This arrangement provides a neat, finished effect of custom hand work by automatic, accurate and rapid means.

In the drawings, the invention is shown applied to a conventional zigzag sewing machine 10 such as the Singer 107W101 which includes means for shifting the work area of the laterally vibrating needle to produce ornamental stitching patterns in the nature of embroidery. It is to be understood that it may be also applied to standard zigzag machines such as the Singer 107W1 or the 143W1 which do not have any means for shifting the work area of the laterally vibrating needle, but to which attachments such as those described in the patents to Sigoda 2,365,222 of December 19, 1944, and 2,500,211 of March 14, 1950, for producing such ornamental stitching, may be applied.

Such machines 10 have a baseplate 11 on which is secured the usual throat plate 12 having slots 13 through which the feed dog 14 (Fig. 18) may operate to advance the work 21 (Fig. 3) to be provided with an embroidered edge 28 in the operation of the machine. Edge 20 of the work moves over plate 12 in abutment with the aligning edges 22 of a cutting mechanism support member 23 in which the cutter mechanism 50 slides laterally as a unit with respect to the line of stitching in accordance with both the rapid lateral needle vibrations and the relatively slow pattern shifting which produces the ornamental effect, as will be more fully explained subsequently.

A conventional compensating presser foot assembly 65 depends from the usual presser foot bar supported in the head of machine 10, and consists of two separate presser shoe portions, 64, 64', as shown in Figs. 10 and 18, secured respectively to the lower ends of presser shoe supports 82 connected by link 83 for interdependent, relative vertical movement.

A conventional lower feed dog 14 (see Fig. 18) having fine pyramidal shaped teeth, commonly known as a diamond toothed feed dog, co-operates with shoes 64, 64' so that the embroidered portion of the work 21 is controlled by shoe 64 and the cut away or waste material 21' is controlled by shoe 64'. Rearwardly beyond the needle action, shoe portions 64 and 64' may be widely separated or cut away as shown in Fig. 10, to permit the scallop to flow freely from the rear of the presser foot. The embroidered portion and the to-be-cut-away waste portion of the work material 21 must be held taut at all times to minimize creeping and consequent loss of control of the work as it is fed rearwardly for the embroidering and trimming operations.

In such machines, the needle bar 24 is reciprocated vertically by means (not shown) well known in the art in a pivoted or swinging needle bar guide frame, the lower end of which 49 is shown in Fig. 18, and a modification of which 49' is shown in Fig. 5.

The needle bar guide frame oscillates laterally across the line of feed of the work to produce the well known zigzag stitch. These lateral excursions are effected in the machine illustrated in Fig. 1 by rotation of cam 18, which determines the lateral distance or throw between needle penetrations A—B or the bight. Cam 18 is connected to the inner end of needle vibrating lever 30 (Figs. 1 and 4) which in turn is connected to needle bar guide frame 49 or 49' through link 59.

Cam 18 may be replaced by the well known eccentric and strap arrangement which has provision for easily changing the extent of eccentricity to provide for selected bight throws. A recent patent describing such mechanism and additional means for automatically varying the bight has been issued to Sigoda 2,500,211 on March 14, 1950.

In addition to this rapid lateral excursion of the needle bar, a relatively slow lateral movement is superimposed thereon to provide the pattern design.

In the instant machine this is produced as follows. Pattern cam 27 secured to cross-shaft 31 is driven by means of gear 32 which in turn is operatively connected with the usual armshaft through suitable gearing (not shown). A bellcrank 33 is pivotally supported on machine 10 by a stud shaft 35. One end of bellcrank 33 carries a cam follower roller 33a which is held engaged with cam surface 34 by means of a spring 33b. While cam 27 appears to be circular in Figs. 1 and 4, it actually deviates sufficiently from the outline of a true circle to provide the desired camming action.

The downwardly depending arm 33c of bellcrank 33 is terminated in a transverse, elongated bearing boss 36 (Fig. 1), in which a cross-shaft 37 is freely journalled. Crossbar 55 is journalled on the free end of shaft 37. One end 56 of crossbar 55 carries pivot stud 57 on which needle vibrating lever 30 is freely mounted. The other end 58 of crossbar 55 carried pivot stud 80 on which link 59 is likewise freely mounted. Link 59 is pivotally connected to needle bar guide frame 49 or 49' at 48.

As cam 27 rotates, bellcrank 33 will rotate a small amount about its pivot 35 causing boss 36 to assume a horizontal, shifting position laterally with respect to the line of feed. This shift will be determined by the eccentricity of cam surface 34, and in turn will determine the general work area in which needle bar 24 will reciprocate vertically while it is also being shifted rapidly laterally by the action of cam 18 which is communicated through arm 30, crossbar 55 and link 59 to the needle bar guide frame 49 or 49'. Cam 27 determines, accordingly, the general pattern or outline of the finished embroidered edge to be sewn by the mechanism described.

The trimming of the embroidered edge is accomplished by means of one form of cutting mechanism generally shown in Figs. 1–15. The entire cutting mechanism is mounted as a unit on the baseplate 11 of the machine 10 in the vicinity of the throat plate 12. A pair of guide rails 23 (see Figs. 16–18) is secured to plate 12 in parallel, spaced relation to define a channel extending inwardly, laterally from the line of feed, to receive the flange edges of slide plate 15, which is part of the cutter mechanism, with sufficient clearance to permit slide plate 15 to reciprocate laterally as required by the swing of frame 49.

As best shown in Fig. 16, throat plate 12 may be slotted or channeled at 12a to accommodate the extending needle plate portion 15a of slide plate 15 as the cutting mechanism shifts position in accordance with the lateral swing of needle bar 24.

Needle plate 15a has the usual needle hole 16 and spaced therefrom a suitably selected distance, a larger opening 17 which acts as a mating cutter or ledger blade for the vertically reciprocating cutter 19.

As shown in Figs. 8, 11 and 12, either integrally formed with plate 15 or secured thereto, is an upright 51. At its forward end upright 51 has a pair of horizontally disposed arms 51a having oblique bores 81 which act as bearings for cutter bar 19 as it is vertically reciprocated into cutting engagement with its ledger blade opening 17.

The vertical reciprocation of cutter 19 is brought about as follows. Affixed to the shaft of cutter bar 19 is a block 44 from which studs 43 project. These studs 43 are loosely engaged with just sufficient clearance to prevent wedging in slots 62 of a double yoked member 53 which is pivotally mounted on upright 51 by pin 52. One end of member 53 is linked to an upright drive lever 47 which is pivotally connected at 54 to oscillate rocker frame 53, thereby causing cutter bar 19 to reciprocate vertically in bearing bores 81.

Lever 47 is caused to reciprocate as follows. A cutter operating cam 39 suitably supported on the machine 10 and driven from the armshaft, has a cam track 39a in which a cam follower roller 38a attached to arm 38 travels. Arm 38 is clamped to cross-shaft 37 which is journalled in boss 36. Arm 45, which is secured to the forward end of shaft 37, is also pivotally connected at 46 with drive lever 47. As cam 39 rotates and the lobe 39b actuates the follower-arm 38, lever 47 will receive one reciprocation through the described linkage, and cutter bar 19 will be operated. Cam 39 is timed so that the cutter bar 19 will descend to make cuts 25 (Figs. 2, 13 and 14) in the waste material 21' past the outer stitch penetrations B when the needle descends to make the inner stitch penetrations A, cutter bar 19 being held in its inoperative position while stitch penetrations B are made.

Drive lever 47' as shown in Fig. 16, may consist of two toggle arms 47a and 47b pivotally joined at 47c. Arm 47a may have a finger piece 47d to facilitate breaking the straight line driving arrangement shown in Fig. 16. By moving finger piece 47d toward the needle bar end of the machine, lever 47' will be made inoperative as arms 47a and 47b will then be disposed in a horizontal V configuration. Vertical movement of arm 47b by its drive means will simply open or close the V without moving arm 47a vertically. Until arms 47a and 47b are returned to the position shown in Fig. 16, rocker frame 53 will not be driven to operate movable cutter bar 19. By this simple expedient the operator may throw the cutting mechanism into or out of operation. By breaking the straight line arrangement of arms 47a and 47b, the predetermined design may be sewn on the whole cloth without any cutting or trimming action when that is desirable. When trimming is required, simple manipulation of finger piece 47d will restore the cutting arrangement.

As pointed out above, the entire cutter mechanism 50 is adapted to slide laterally in the rails 23a of member 23. This generally horizontal reciprocation which is normal to the line of feed is brought about in unison with the lateral excursions of needle bar guide frame 49' by means of a depending yoked portion 49a of guide 49' which straddles upright 51. Slots 61 of this yoked portion 49a fit loosely over studs 60 which projects crosswise of upright 51 with just sufficient play to prevent binding as frame 49' swings laterally to and fro. Thus as link 59 reciprocates horizontally in accordance with both the lateral vibration component and the pattern movement component, the entire cutter mechanism 50 travels with it, and accordingly with the needle bar 24.

The cutting mechanism shown in Figs. 16–18 differs in several respects. Slide plate 15' has secured to it a vertical upright 51' in which the reciprocating cutter 19' operates and a bearing portion 52' at one end through which a connection is made with drive lever 47' to provide the required vertical cutter reciprocation.

Cutter bar 19' is vertically journalled in the forward end of upright 51' and fixed to a U-shaped key 128 which also is vertically slidable in upright 51'. Link 130 is connected by pivot pin 129 to key 128 to vertically reciprocate cutter bar 19' in synchronism with drive lever 47'. A U-shaped bracket 133 is fixed to base 11'. Pin 134 passes through vertical slots 135 in the arms of bracket 133 and is journalled in the lower arm 47a of drive lever 47'. Spring clips 136 or the like may be secured to the arms of bracket 133 to cushion the upward movement of pin 134.

Stub shaft 137, which is journalled in a bearing hole in pin 134, is capable of both horizontal sliding movement and rotary motion in said bearing. Shaft 137 is fixed to one arm of rocker frame 53' which is journalled for rotary motion only, in tubular bearing portion 52', integral with or attached to slide plate 15'. As slide plate 15' shifts in accordance with the lateral excursions of the needle, stub shaft 137 slides horizontally in pin 134 while continuing to transmit the reciprocating motion provided by lever 47' to drive cutter bar 19.

The lateral reciprocation is provided from needle bar guide 49 by a connection with slide plate 15'. Socket 117 receives downwardly extending drive bar 118 which is secured to bracket 119 clamped on guide 49.

Where it is desired to lay a filler such as gimp under the stitching as the design is being sewn, it is necessary to cause the gimp feeding tube to operate in the same general work area in which the needle bar 24 is reciprocating. In addition, it has been found desirable to cause the gimp feeding tube 41 to operate in opposition to the rapid lateral vibration of needle bar 24. Thus when the needle descends to make the inner needle penetration A, for example, as shown in Fig. 2, the gimp is drawn to the right of the needle (viewing the parts as shown in Fig. 1), while, when the needle descends to make the next needle penetration B, gimp 42 is drawn to the left of the needle against the thread extending from the last needle penetration A. This is accomplished in the version shown in Figs. 1, 2, 6, 7 and 15 as follows.

Needle bar guide frame 49' is provided with a bore for a bushing in which needle bar 24 reciprocates vertically, and an additional bore in parallel, spaced relation thereto, in which gimp tube support 40 is journalled, thus ensuring that the gimp feeding mechanism will move in unison with the lateral excursions of the needle bar 24 in response to the overall pattern determined by the interaction of cams 27 and 18.

To provide the opposing oscillation of the gimp tube (indicated at R, Fig. 6) gimp tube support 40 has a tongue 70 which is freely received in recess 71 of a U-shaped block 72 slidably positioned on a stud shaft 73 which is secured to a boss 74 which is integral with the head of machine 10 (see Fig. 7). Block 72 is normally urged away from boss 74 by spring 75 which urges block 72 into engagement with end 76 of link 77, the other end of which is pivotally connected by stud 57 to end 56 of crossbar 55. End 76 has a shouldered portion 78 which engages a mating shoulder 79 on block 72. Stud shaft 73 is provided with a head 63 to maintain the parts in the position described, as clearly shown in Fig. 7.

As crossbar 55 oscillates, link 77 will reciprocate, and on the inward movement, shoulder 78 will bear against shoulder 79 on block 72, compressing spring 75 and causing gimp tube support 40 to be rotated to the right as the parts are viewed in Fig. 1. On the outward movement of link 77, shoulder 76 will be disengaged from shoulder 78, and spring 75 will cause block 72 to return to its first position which will cause gimp tube support 40 to be rotated to the left as the parts are viewed in Fig. 1.

However, since link 77 is attached to end 56 of crossbar 55 its motion will be 180 degrees out of phase with the movement of link 59 which laterally vibrates needle bar guide frame 49', thus causing gimp 42 to be laid under the stitching in the desired manner.

The gimp guiding arrangement of Figs. 16, 18, 19 and 20 differs in some details from the version above described. Gimp tube support 40' is rotatably journalled in the bracket 119 attached to guide frame 49, sleeve 40a being slidably arranged on support 40' and connected thereto by a pin and slot arrangement 40b with spring 68' or some similar means urging sleeve 40a downwardly. Gimp tube 41' is fixed to the lower end of sleeve 40a.

This gimp guiding arrangement is operated by the following mechanism. Cam member 86 journalled on pivot 48', has an elongated slot 87 at one end which receives a screw 88 to lock it on link 59' in any selected position to limit thereby the amount of cam action. The upper end of gimp support 40' has clamped to it a bracket 90 by which support 40' may be rotated. Roller 91 is rotatably journalled on bracket 90 (see Fig. 19) in position to be acted upon by the cam edge 89 of cam member 86 when the needle is shifted to the inner side of the machine to make needle penetrations B. At such time link 59' changes its position obliquely as it is shifted by the action of cam 18. This causes the cam edge 89 to bear upon roller 91 thus causing support 40' and gimp tube 41' to shift in opposition to the shift of the needle. Gimp tube 41' is then to the left of the needle as the parts are viewed in Fig. 18. When link 59' moves to the left, cam edge 89 is raised out of engagement with roller 91 and spring 92 rotates support 40' so that gimp tube 41' is then to the right of the needle.

As shown in Fig. 18, thread guides 84 and 85 may be provided through which the needle thread and the gimp cord 42 may pass to the needle and the gimp guiding tube 41', respectively.

To prevent interference with the gimp support tube 41 when the presser foot assembly 65 is raised for the insertion or removal of the work, gimp support 40 may have a collar 66 (see Figs. 1, 4 and 6) attached thereto, having pin 66' extending therefrom to engage finger 67 which is attached to the presser foot bar. By interposing spring 68 between the collar 66 and the lower end of guide frame 49 (see Fig. 1) pin 66' will normally be kept in engagement with finger 67 to bring about the simultaneous raising of gimp support 40 when the presser foot bar is lifted.

The edge trimming action takes place as follows. Referring to Figure 21, as needle 24a penetrates the material 21 for stroke A-1 which is on the inner side of the embroidery design or scallop, movable cutter bar 19 descends, making a cut 25 (Figs. 2 and 3) described about center 1 (Fig. 21), and then rises out of the way. As needle 24a swings to the right to make stroke B-1, movable cutter bar 19 remains at rest. As needle 24a swings to the left to make stroke A-2, movable cutter bar 19 again descends, making the cut described about center 2.

The successive arcs of the cuts 25 made about centers 1, 2, et seq., overlap as indicated in Fig. 3. As these arcs are relatively large with respect to the distance between such needle strokes as B-1 and B-2 (Fig. 21), the cut edge that results looks like a continuously flowing clean edge.

The center about which successive cuts are made lies in a plane which intersects only those needle penetrations on the inner side of the embroidery, and this plane is also at a right angle to the general feed path of the work rearwardly. The distance between this center line Z—Z and the axial line X—X of the zigzag stitching remains fixed in this embodiment, as shown by the fixed distance between openings 16 and 17 in needle plate 15.

However, as all modern zigzag machines have some provision for varying the bight, changes in the extent of the bight will determine whether a margin remains after trimming the excess material from the sewn design edge.

When the bight adjusting control previously mentioned is set so that there is no lateral needle throw between successive stitches, the stitching that results consists of a continuous straight line of sttiches having no lateral displacement. This would resemble the axial pattern line produced by the design cam 27, and would be the same as the median line x—x in Fig. 21. The largest possible edge margin would then be left after trimming.

On the other hand, when the bight control is adjusted for a relatively large lateral throw between successive stitch penetrations (see A'—1 and B'—1 et seq., dotted lines Fig. 21), the distance between the median line of stitching and the center about which cuts 25 are made remaining constant in both cases, trimming will now take place inside the extreme line of needle throw to the right of B'—1, B'—2 etc. and accordingly when such needle strokes are made, the cut edge Y—Y will be overcast by the thread.

Thus by appropriate adjustment of the bight control more or less edge margin may be had.

While overcasting has been practised in the prior art, the circumstances under which it has been done, namely precutting the design, entails loss of control over the work. In the instant arrangement, where the cutting and overcasting may be done within the limits of but one lateral stitch, the stitching and cutting operations are for all practical purposes simultaneous, and accordingly control over the material is retained.

The cutting may take the form of punching out successive multilated disks of material as indicated in Fig. 3, if the movable cutter 19 be constructed so that it makes a complete cut each time it engages the stationary blade opening 17. However, it is found preferable to arrange the cutting edge of movable cutter 19 so that it does not cut a complete circle on each stroke but only a short arcuate portion intersecting the edge of the work which is to be trimmed. This has a marked practical advantage as the cuttings remain attached to the waste portion and as they are not forced into ledger blade 17, clogging or choking is avoided thus making the device more effective.

Cams 27, 39 and 18 are driven from the usual armshaft by any suitable gearing arrangement, so that all cams operate in unison and in proper timed relationship. It is essential in view of the fact that frame 49 swings laterally as needle penetrations A and B are made that cam 39 be timed to operate the cutter bar 19 only once in each two needle reciprocations, and that cutter bar 19 descend to make cuts 25 only when needle bar 24 is making needle penetrations A to avoid obvious interference between the functions of stitching and trimming.

The foregoing description illustrates practical embodiments of the invention and will suggest other forms for attaining the same end. Such other forms as come within the scope of the appended claims are to be construed to be within the the purview of the instant invention.

What is claimed is:

1. In a zigzag sewing machine having a base and a pivotally mounted, laterally oscillating guide frame for a vertically reciprocating needle bar carrying a needle, trimming means comprising a plate slidably disposed on said base for lateral movement with respect to the line of feed, a cutting element disposed in said slide plate, a cutting element movably mounted on said slide plate above and in mating relation with said lower cutting element for coaction therewith, said cutting elements being positioned on said slide plate to make cuts in the work immediately adjacent alternate needle penetrations, means carried by said slide plate connecting with the upper cutting element to move it into cutting engagement with the lower cutting element and means depending from said needle guide frame arranged to engage said slide plate for movement in unison therewith.

2. In a zigzag sewing machine having a base and a pivotally mounted, laterally oscillating guide frame for a vertically reciprocating needle bar carrying a needle, trimming means comprising a slide plate, means for slidably mounting said plate on said base for lateral movement with respect to the line of feed, means connecting said slide plate with said needle guide frame for movement in unison therewith, cutting means mounted on said slide plate and so disposed thereon that as said slide plate shifts in unison with said needle guide frame said cutting means remains adjacent the point of needle penetration in the work in position to trim waste material from one side of the stitching, means operatively connecting said cutting means and the guide frame for movement in unison therewith, and operating means timed to actuate said cutting means only when said guide frame is at one side of its lateral oscillation.

3. In a zigzag sewing machine having a pivotally mounted, laterally oscillating guide frame for a vertically reciprocating needle bar and a needle carried thereby, trimming means comprising an upper cutter and a lower cutter arranged to operate in a fixed position relative the point of needle penetration in the work at one side thereof, means to move said cutters in unison in a predetermined plane with said guide frame and means engaging one of said cutters to move the same against the other to cut at every other stroke of said needle to thus dispose the cuts adjacent only one side of the stitching.

4. A machine in accordance with claim 3, in which the lower cutter is in a plate slidably disposed on the base of the machine, a bearing is carried by said plate, a rocker frame is rotatably supported thereby, an upright is carried by said plate, and a member is connected to said rocker frame and journalled in said upright for vertical reciprocation therein and in which said member carries said upper cutter in alignment with said lower cutter for cooperation therewith in cutting material positioned between said cutting members on actuation of the rocker frame.

5. In a zigzag sewing machine having a pivotally mounted and laterally oscillating guide frame for a vertically reciprocating needle bar and a needle carried thereby, means for trimming excess or waste material from one side of the stitching comprising a cutter carrier, means mounting said carrier for movement laterally of the line of feed of the work, cutting means mounted on said carrier positioned thereon so that said cutting means operates in the vicinity of the needle penetrations in the work, means connecting said carrier with said guide frame to shift said carrier laterally with each excursion of said frame, and cam operated means to actuate said cutting means in timed relation to said stitching on every other material penetrating stroke of said needle.

6. A machine in accordance with claim 5, in which the means for actuating the cutting means in timed relation to the needle stroke also includes a first vertically reciprocating arm, a second arm pivotally connected thereto and arranged to be reciprocated thereby, and means for disposing said arms with respect to each other to make said arms ineffective for transmitting motion to actuate the cutting means.

7. In a zigzag sewing machine having a pivotally mounted and laterally oscillating guide frame for a vertically reciprocating needle bar and a needle carried thereby, means for trimming excess or waste material from one side of the stitching, a cutter carrier, means mounting said carrier for movement laterally of the line of feed of the work, a needle plate carried by said cutter carrier, said needle plate having a portion adapted to act as one cutting element, a movable cutting element mounted on said carrier in co-operative relation with the first cutting element, means connecting said carrier with said guide frame to shift said carrier laterally with each excursion of said frame, and cam operated means to actuate said cutting elements in timed relation to said stitching on every other material penetrating stroke of said needle.

8. In a sewing machine, the combination with stitch forming mechanism including a needle bar and a needle carried thereby, a guide frame for said bar, and mechanism for imparting lateral vibratory motion and concurrent shifting to said frame to form a design; of means for trimming excess or waste material from one side of the design comprising a slide plate, a bearing member mounted thereon, a rocker frame journalled in said bearing, a vertically reciprocating drive link, a horizontally slidable connection between said rocker frame and said drive link to maintain constant engagement thereof to transmit vertical motion to said rocker frame, a lower cutting element connected with said slide plate for movement therewith, a cutter support mounted on said slide plate, a vertically reciprocating cutter journalled therein arranged to co-act with the lower cutting element, means to reciprocate said vertically reciprocating cutter from said rocker frame, and means connected with said guide frame to shift the slide plate in unison therewith in accordance with the lateral shifting of said guide frame.

9. In a sewing machine having a housing, a needle bar guide frame pivotally mounted in said housing and a drive link for swinging said frame laterally across the line of feed connected thereto, a slide plate, means for slidably mounting said plate on the sewing machine, a cutter mounted on said slide plate, means operatively connecting said cutter and said guide frame for swinging said cutter and slide plate in unison with the lateral excursions of said guide frame, said cutter being disposed on said slide plate so that the cutting takes places immediately adjacent the needle penetrations in the work, a gimp tube support rotatably mounted on said machine, means on said drive link engaging said support to rotate the latter in one direction and means engaging said link and support to rotate the latter in the opposite direction as said drive link shifts said guide frame.

10. In a sewing machine having a needle bar, a needle carried by said bar, and a base, a frame in which said needle bar is journalled, a drive link connected to said frame, a bracket secured to said frame, a gimp tube support journalled in said bracket, means engaging said support and link to rotate the gimp tube in opposite directions to dispose the gimp at opposite sides of the needle in operation, a plate slidably disposed on said base and engaged by said bracket for movement in unison therewith, an upper cutting member, and means carried by said slide plate and engaging said upper cutting member to actuate the latter.

11. In a sewing machine having a needle bar, a needle carried thereby, and a base, a frame in which said needle bar is journalled for vertical reciprocation, a drive link connected to said frame, a bracket secured to said frame, a gimp tube support journalled in said bracket, said gimp tube support, needle bar, bracket and frame being thus connected together for movement in unison, means engaging said support and link to rotate the gimp tube in opposite directions to dispose the gimp at opposite sides of said needle in operation, a slide plate slidably disposed on said base and engaged by said bracket for movement in unison therewith, a lower cutting element in said slide plate, an upper cutting member, and means carried by said upper cutting member to move the latter into cutting engagement with the lower cutting element.

12. In a sewing machine having a pivotally mounted and laterally oscillating guide frame for a vertically reciprocating needle bar, a bracket secured to said frame, a gimp tube support rotatably journalled in said bracket, a drive link connected to said frame, a cam connected to said link and movable against the gimp tube support to rotate the latter in one direction on movement of the link in the opposite direction, and resilient means to rotate the gimp tube support in its reverse direction on movement of said link in its reverse direction.

13. In a sewing machine having a pivotally mounted and laterally oscillating guide frame for a vertically reciprocating needle bar, a gimp tube support, means integral with said guide frame for rotatably and reciprocably mounting said gimp tube support therein, a pivotally mounted crossbar, means connected with said crossbar to produce oscillation thereof, a drive link connected to said crossbar and to said guide frame, a second drive link connected to the opposite end of said crossbar and to intermediate means connected with said gimp tube support, and means associated with said gimp tube support and said second link to rotate said support in a direction opposite to that of said guide frame.

14. In a sewing machine having a pivotally mounted guide frame for a vertically reciprocating needle bar, cam means and associated linkage connected with said guide frame to provide for a relatively rapid lateral oscillation of said frame, a second cam means and associated linkage connected with said guide frame to superimpose a slower design movement on said rapid lateral oscillation, a cutter mechanism arranged to move in unison with said frame and to operate immediately adjacent the point of needle penetration at one side of the line of stitching, a third cam means and associated linkage arranged to operate said cutter mechanism, said various cam means being maintained in such timed relationship to each other that said cutter mechanism is actuated once for each two rapid lateral oscillations of said guide frame, said actuation taking place only when said frame is at one side of its lateral excursions.

15. In a sewing machine having a pivotally mounted and laterally oscillating guide frame for a vertically reciprocating needle bar, and a base, a cutter mechanism slidably mounted on said base, said guide frame having an integral, downwardly depending yoked portion arranged to engage said cutter mechanism to move it in unison with the lateral excursions of said frame.

16. In a sewing machine having a pivotally mounted and laterally oscillating guide frame for a vertically reciprocating needle bar, a bellcrank having one end provided with a horizontally disposed bearing journal, cam means to oscillate said bellcrank in accordance with a predetermined design pattern, a shaft rotatably disposed in said bearing journal of said bellcrank, a crossbar rotatably journalled on said shaft, an eccentric needle vibrating means, a link connected therewith and with one end of said crossbar, a second link connected with the other end of said crossbar and with said frame to cause said frame to oscillate laterally, a cutter mechanism connected with said frame for movement in unison therewith, a cutter operating cam means operatively connected with said shaft, and means connected with said shaft for operating said cutter mechanism.

17. In a sewing machine having a pivotally mounted and laterally oscillating guide frame for a vertically reciprocating needle bar and a needle carried thereby, eccentric means for laterally vibrating said guide frame so that zigzag stitching may be sewn by the needle in the work, a cutter mechanism for trimming excess or waste material from one side of the stitching slidably disposed on the machine, means connected with said frame for shifting said cutter mechanism in accordance with the lateral excursions of said guide frame, said cutter mechanism being spaced to make a series of cuts in the work a predetermined distance from the median line of said lateral oscillations, and means for adjusting said eccentric whereby the lateral length of such zigzag stitching may be regulated so that at certain selected positions thereof the stitching may overcast the cut edge of the work, and at other selected positions thereof, a selected margin may remain after trimming.

No references cited.